(12) United States Patent
Kuo

(10) Patent No.: US 7,688,020 B2
(45) Date of Patent: Mar. 30, 2010

(54) STEP MOTOR DRIVING CIRCUITS

(75) Inventor: Jung-Yen Kuo, Yunlin County (TW)

(73) Assignee: Princeton Technology Corporation, Taipei County (TW)

( * ) Notice: Subject to any disclaimer, the term of this patent is extended or adjusted under 35 U.S.C. 154(b) by 285 days.

(21) Appl. No.: 11/878,412

(22) Filed: Jul. 24, 2007

(65) Prior Publication Data

US 2008/0265827 A1   Oct. 30, 2008

(30) Foreign Application Priority Data

Apr. 24, 2007   (TW) .............................. 96114367 A

(51) Int. Cl.
*H02P 8/00* (2006.01)

(52) U.S. Cl. ...................... 318/696; 318/105; 318/106; 318/109; 327/88; 327/142; 327/285

(58) Field of Classification Search ......... 318/106–109, 318/504, 696; 326/57, 58, 62, 68, 80, 83, 326/87; 327/88, 108, 109, 141, 142, 198, 327/285, 288, 333
See application file for complete search history.

(56) References Cited

U.S. PATENT DOCUMENTS

| 6,107,832 A * | 8/2000 | Taniguchi ..................... 326/81 |
| 7,061,299 B2 * | 6/2006 | Khan et al. .................. 327/333 |
| 7,068,091 B1 * | 6/2006 | Kwong ........................ 327/333 |
| 2007/0085590 A1 * | 4/2007 | Wang .......................... 327/333 |
| 2007/0222478 A1 * | 9/2007 | Chen et al. .................... 326/80 |

* cited by examiner

*Primary Examiner*—Bentsu Ro
*Assistant Examiner*—Thai Dinh
(74) *Attorney, Agent, or Firm*—Muncy, Geissler, Olds & Lowe, PLLC

(57) ABSTRACT

A step motor driving circuit is provided. An exemplary step motor driving circuit includes an input voltage source set, a reference voltage source, a voltage level shift unit, a logic unit, a reset voltage source, and an output voltage terminal. The input voltage source set provides an input voltage set. The reference voltage source provides a reference voltage. The voltage level shift unit raises one of the levels of the input voltage set to a level of the reference voltage. The logic unit receives the reference voltage and the input voltage set and outputs a control voltage. The reset voltage source outputs a reset voltage to reset the logic unit. The output voltage terminal receives the control voltage and outputs an output voltage.

7 Claims, 4 Drawing Sheets

US 7,688,020 B2

STEP MOTOR DRIVING CIRCUITS

BACKGROUND OF THE INVENTION

1. Field of the Invention

The invention relates to a step motor driving circuit, and more particularly to a step motor driving circuit for a step motor.

2. Description of the Related Art

Typically, in a conventional step motor, an H bridge circuit drives the step motor to rotate in different directions and also to stop. As shown in FIG. 1, an H bridge circuit 1 comprises four metal oxide semiconductors (MOSs). The direction of rotation of a motor 15 is controlled by turning on the first MOS 11 and the third MOS 13 or turning on the second MOS 12 and the fourth MOS 14. The input of voltage is required at the MOS gates to turn each MOS on or off. Because a different voltage is required to turn on each MOS, a different output voltage circuit controls each MOS. Thus, the gate of each MOS is coupled to an output voltage. Voltages from the output voltage circuits control the H bridge circuit to drive a step motor.

Each output voltage circuit has an input voltage. If the input voltage is used to directly turn on a MOS, excessive power is consumed, degrading efficiency. An output voltage circuit is thus required to raise an input voltage to a sufficient level to turn on a MOS, thereby driving the H bridge circuit to operate.

A conventional H bridge circuit comprises four MOSs. A gate of each MOS is coupled to an output voltage circuit. Each MOS is turned on by a high level voltage output from the output voltage circuit to drive a motor. When one set of two MOSs, or a MOS pair, is turned on, the other two MOS pairs are turned off. If the MOS pair to be turned off is not actually turned off, or if the output voltages are unstable due to leakage current, the H bridge circuit may operate incorrectly and rotate in the wrong direction, and the motor may be damaged. An output voltage circuit capable of ameliorating the described disadvantages is thus desirable.

BRIEF SUMMARY OF THE INVENTION

Step motor driving circuits are provided. An exemplary embodiment of a step motor driving circuit comprises an input voltage source set, a reference voltage source, a voltage level shift unit, a logic unit, a reset voltage source, and an output voltage terminal. The input voltage source set provides an input voltage set. The reference voltage source provides a reference voltage. The voltage level shift unit raises one of the levels of the input voltage set to a level of the reference voltage. The logic unit receives the reference voltage and the input voltage set and outputs a control voltage. The reset voltage source outputs a reset voltage to reset the logic unit. The output voltage terminal receives the control voltage and outputs an output voltage.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
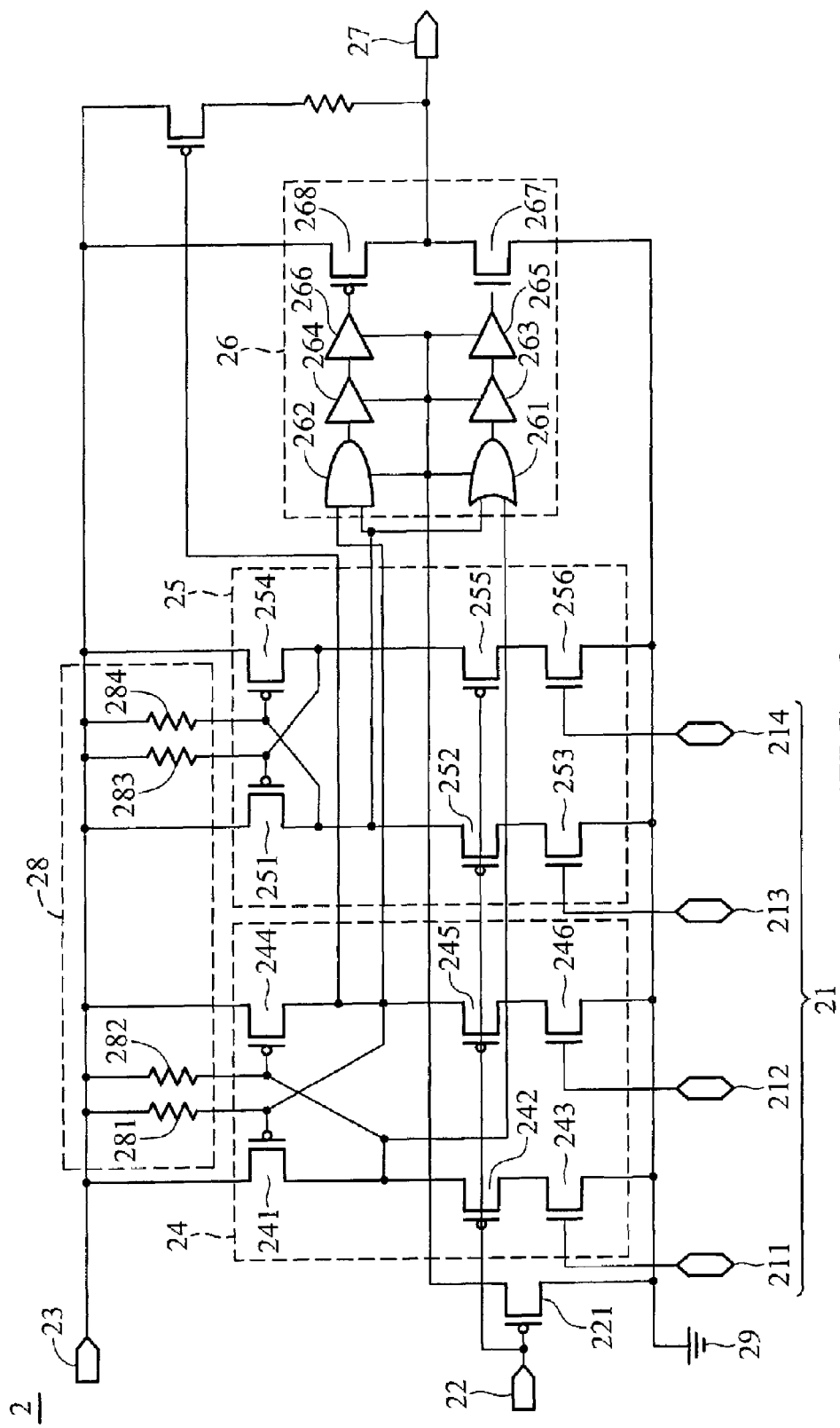
FIG. 2 shows an exemplary embodiment of a step motor driving circuit.

Step motor driving circuits are provided. In an exemplary embodiment of a step motor driving circuit shown in FIG. 2, a step motor driving circuit 2 comprises an input voltage source set 21, a reset voltage source 22, a reference voltage source 23, a first voltage level shift unit 24, a second voltage level shift unit 25, a logic unit 26, an output voltage source 27, a stabilizing unit 28, and a ground 29.

Figure 3A:
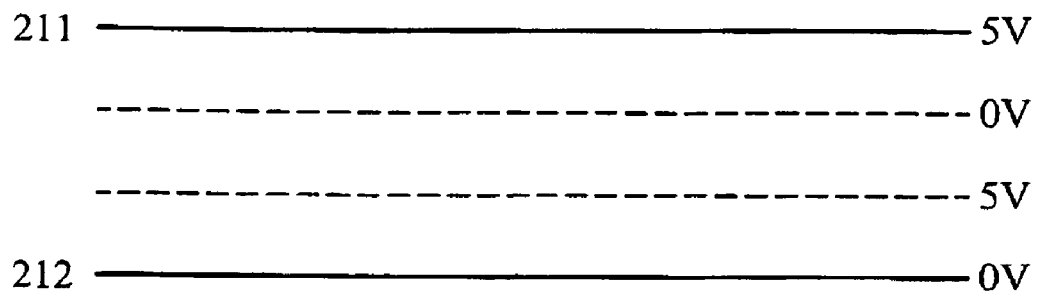
FIGS. 3a-3d show the levels of the first, second, third, and fourth input voltages.
Figure 3B:
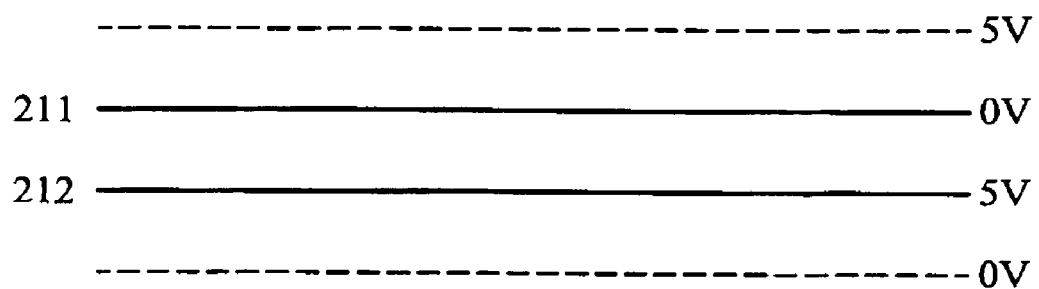
Figure 3C:
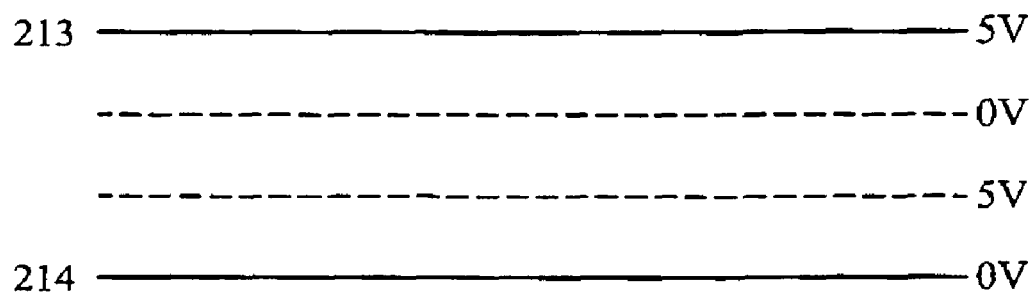
Figure 3D:
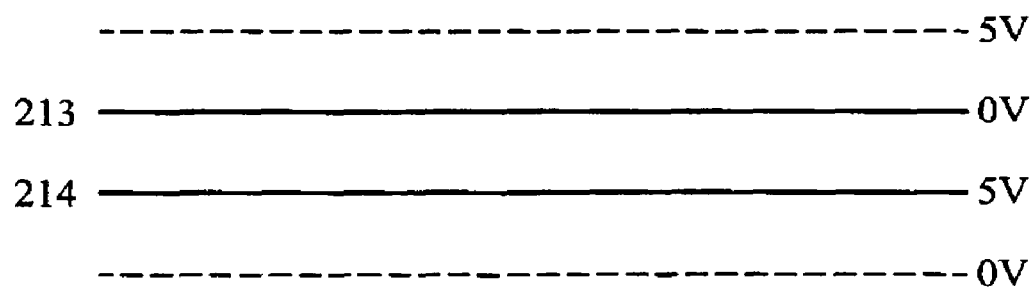

The input voltage source set 21 comprises a first input voltage source 211, a second input voltage source 212, a third input voltage source 213, and a fourth input voltage source 214 inputting a first input voltage, a second input voltage, a third input voltage, and a fourth input voltage respectively. The first to fourth input voltages are referred to as an input voltage set, and voltage levels of the input voltage set are 0V or 5V. The first input voltage and the second input voltage are inverted, and the third input voltage and the fourth input voltage are inverted. When the level of the first input voltage is 5V, the level of the second input voltage is 0V, as shown in FIG. 3a, conversely, when the level of the first input voltage is 0V, the level of the second input voltage is 5V, as shown in FIG. 3b. When the level of the third input voltage is 5V, the level of the fourth input voltage is 0V, as shown in FIG. 3c, conversely, when the level of the third input voltage is 0V, the level of the fourth input voltage is 5V, as shown in FIG. 3d.

The reference voltage source 23 provides a reference voltage with a level of 24V. The reference voltage source 23 is coupled to one terminal of the first voltage level shift unit 24 and one terminal of the second t voltage level shift unit 25. The other terminal of the first voltage level shift unit 24 and the other terminal of the second voltage level shift unit 25 is coupled to the input voltage source set 21.

The first voltage level shift unit 24 comprises a first P-type metal oxide semiconductor (PMOS) 241, a second PMOS 242, a first N-type metal oxide semiconductor (NMOS) 243, a third PMOS 244, a fourth PMOS 245, and a second NMOS 246. The second voltage level shift unit 25 comprises a fifth PMOS 251, a sixth PMOS 252, a third NMOS 253, a seventh PMOS 254, a eighth PMOS 255, and a fourth NMOS 256. The first and second voltage level shift units 24 and 25 are referred to a voltage level shift unit. A source of the first PMOS 241 is coupled to the reference voltage source 23, and a drain thereof is coupled to a drain of the second PMOS 242. A source of the second PMOS 242 is coupled to a drain of the first NMOS 243. A source of the first NMOS 243 is coupled to the ground 29, and a gate thereof is coupled to the first input voltage source 211. A source of the third PMOS 244 is coupled to the reference voltage source 23, and a drain thereof is coupled to a drain of the fourth PMOS 245. A source of the fourth PMOS 245 is coupled to a drain of the second NMOS 246. A source of the second NMOS 246 is coupled to the ground 29, and a gate thereof is coupled to the second input voltage source 212. A source of the fifth PMOS 251 is coupled to the reference voltage source 23, and a drain thereof is coupled to a drain of the sixth PMOS 252. A source of the sixth PMOS 252 is coupled to a drain of the third NMOS 253. A source of the third NMOS 253 is coupled to the ground 29, and a gate thereof is coupled to the third input voltage source 213. A source of the seventh PMOS 254 is coupled to the reference voltage source 23, and a drain thereof is coupled to a drain of the eighth PMOS 255. A source of the eighth PMOS 255 is coupled to a drain of the fourth NMOS 256. A source of the fourth NMOS 256 is coupled to the ground 29, and a gate thereof is coupled to the fourth input voltage source 214.

Through the operation of the MOSs in the first and second voltage level shift units 24 and 25, the first voltage level shift unit 24 raises the voltage level of the first input voltage source 211 or the second input voltage source 212 in the input voltage source set 21 to the level of the reference voltage source 23, and the second voltage level shift unit 25 raises the level of the third voltage source 231 or the fourth voltage source 214 in the input voltage source set 21 to the level of the reference voltage source 23.

The reset voltage source 22 is coupled to gates of the second, fourth, sixth, eighth, and ninth PMOSs 242, 244, 252, 254, and 221. A source of the ninth PMOS 221 is coupled to the ground 29, and a drain thereof is coupled to a control terminal of the logic unit 26. When the reset voltage source 22 outputs a reset voltage, the ninth PMOS 221 is turned on, thus, a voltage from the logic unit 26 enters the ground 29 through the turned-on ninth PMOS 29, and the reset operation of the logic unit 26 is accomplished. At the same time, the second, fourth, sixth, and eighth PMOSs 242, 244, 252, and 254 are turned on for new voltage level raising operations.

The logic unit 26 comprises a NOR gate 261, a NAND gate 262, a first inverter 263, a second inverter 264, a third inverter 265, a fourth inverter 266, a fifth NMOS 267, and a tenth PMOS 268. An input terminal of the NOR gate 261 is coupled to the drains of the first PMOS 241, the second PMOS 242, the fifth PMOS 251, and the sixth PMOS 252, and an output terminal thereof is coupled to an input terminal of the first inverter 263. An input terminal of the NAND gate 262 is coupled to the drains of the third PMOS 244, the fourth NMOS 245, the fifth PMOS 251, and the sixth PMOS 252, and an output terminal thereof is coupled to an input terminal of the second inverter 264. An output terminal of the first inverter 263 is coupled to an input terminal of the third inverter 265, and an output terminal of the third inverter 265 is coupled to a gate of the fifth NMOS 267. An output terminal of the second inverter 264 is coupled to an input terminal of the fourth inverter 266, and an output terminal of the fourth inverter 266 is coupled to a gate of the tenth PMOS 268. The logic unit 26 generates and outputs a control voltage according to the received voltages.

Figure 1:
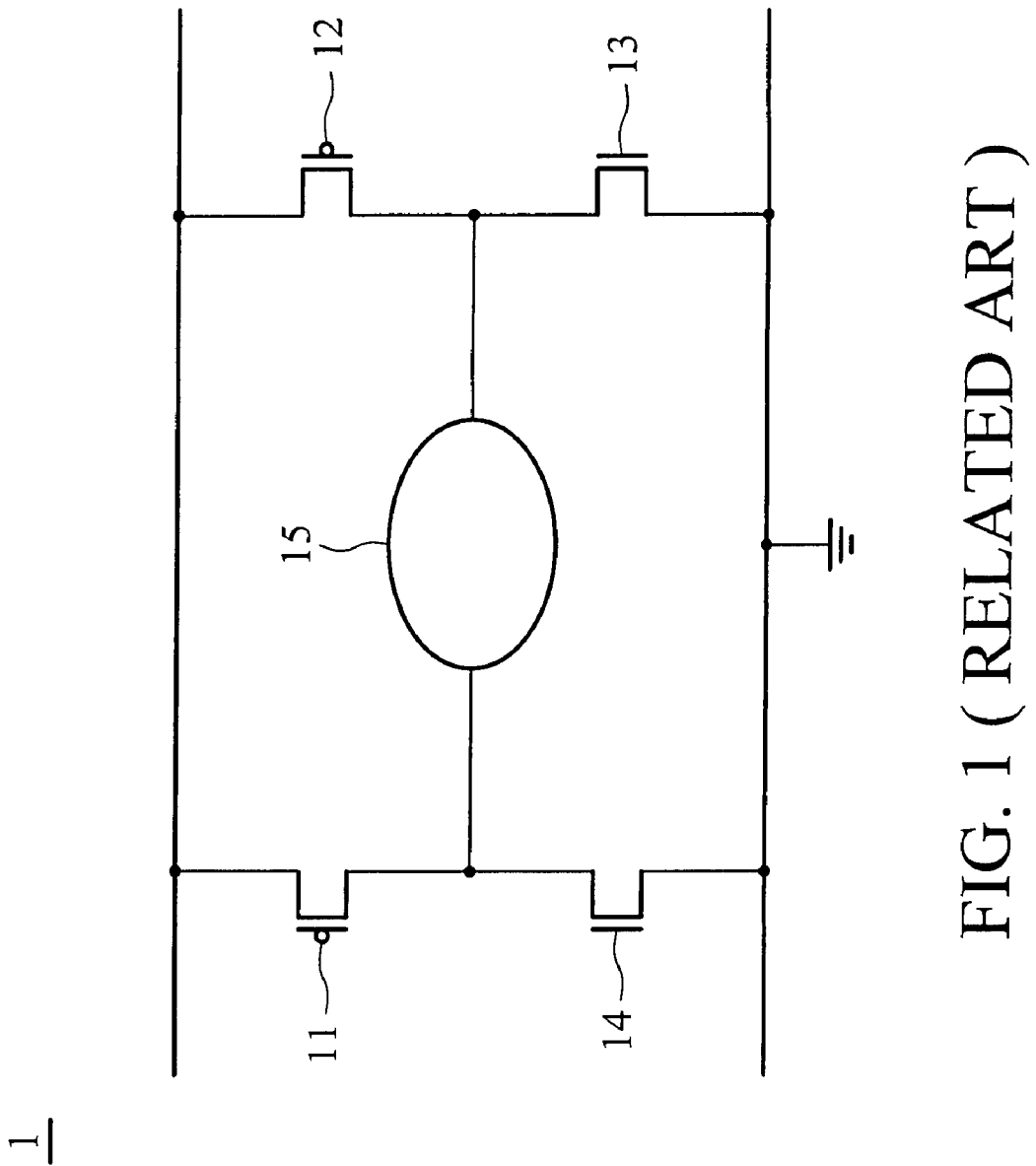
FIG. 1 shows a conventional H bridge circuit.

The output voltage source 27 is coupled to drains of the tenth PMOS 268 and the fifth NMOS 267. The output voltage source 27 receives and outputs the control voltage to turn the MOSs in the H bridge circuit of FIG. 1 on or off.

Typically, when the motor driving circuit 2 is supplied with power, the voltage at the input terminal of the logic unit 26 may be unstable due to power surges. When the unstable voltage is too great, an unintended voltage passes through the logic unit. The voltage level shift circuit outputs an abnormal voltage, resulting in abnormal operation. The stabilizing unit 28 comprises a first resistor 281, a second resistor 282, a third resistor 283, and a fourth resistor 284. The first resistor 281 is coupled between the reference voltage source 23 and the gate of the first PMOS 241. The second resistor 282 is coupled between the reference voltage source 23 and the gate of the third PMOS 244. The third resistor 283 is coupled between the reference voltage source 23 and the gate of the fifth PMOS 251. The fourth resistor 284 is coupled between the reference voltage source 23 and the gate of the seventh PMOS 254. When the motor driving circuit 2 is supplied with power, the stabilizing unit 28 fixes the voltage at the input terminal of the logic unit 26 at the same voltage level as the reference voltage, preventing abnormal voltage levels and system malfunctions due to leakage current.

According the foregoing description, the step motor driving circuit can effectively drive a motor. The first and second input voltage sources 211 and 212 determine whether the step motor driving circuit will operate. The voltage level shift units 24 and 25 raise an input voltage to the level of the reference voltage. The stabilizing unit 28 prevents leakage current and unstable voltage levels when the motor driving circuit is supplied with power. Additionally, the reset voltage source 22 can prevent abnormal operation when the remaining voltage is provided to the logic unit 26. Thus the step motor driving circuit improves on the conventional technology.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A step motor driving circuit comprising:
   an input voltage source set providing an input voltage set;
   a reference voltage source providing a reference voltage;
   a voltage level shift unit raising one of levels of the input voltage set to a level of the reference voltage;
   a logic unit receiving the reference voltage and the input voltage set and outputting a control voltage;
   a reset voltage source outputting a reset voltage to control the logic unit to perform a reset operation; and
   an output voltage terminal receiving the control voltage and outputting an output voltage.

2. The step motor driving circuit as claimed in claim 1 further comprising a stabilizing unit preventing leakage resulting in the motor driving circuit and comprising a plurality of resistors coupled between the reference voltage source and the voltage level shift unit.

3. The step motor driving circuit as claimed in claim 1, wherein the input voltage source set comprises a first input voltage source, a second input voltage source, a third input voltage source, and a fourth input voltage source respectively inputting a first input voltage, a second input voltage, a third input voltage, and a fourth input voltage, the first input voltage and the second input voltage are inverted, and the third input voltage and the fourth input voltage are inverted.

4. The step motor driving circuit as claimed in claim 3,
   wherein levels of the first, second, third, and fourth input voltages are 0V or 5V;
   wherein the level of the second input voltage is 0V when the level of the first input voltage is 5V, and the level of the second input voltage is 5V when the level of the first input voltage is 0V; and
   wherein the level of the fourth input voltage is 0V when the level of the third input voltage is 5V, and the level of the fourth input voltage is 5V when the level of the third input voltage is 0V.

5. The step motor driving circuit as claimed in claim 1, wherein the voltage level shift unit comprises eight P-type metal oxide semiconductors (PMOSs) and four N-type metal oxide semiconductors (NMOSs).

6. The step motor driving circuit as claimed in claim 1, wherein the logic unit comprises an NOR gate, an NAND gate, and a plurality of inverters.

7. The step motor driving circuit as claimed in claim 1, wherein the reset voltage source is coupled to a control terminal of the logic unit.

* * * * *